(No Model.)

J. LEVI.
Shield Pin for Shawls, &c.

No. 239,810.                           Patented April 5, 1881.

Witnesses
Chas. H. Smith
J. Hait

Inventor
Joseph Levi
per Lemuel W. Serrell
atty

UNITED STATES PATENT OFFICE.

JOSEPH LEVI, OF NEW YORK, N. Y.

SHIELD-PIN FOR SHAWLS, &c.

SPECIFICATION forming part of Letters Patent No. 239,810, dated April 5, 1881.

Application filed January 24, 1881. (No model.)

*To all whom it may concern:*

Be it known that I, JOSEPH LEVI, of the city and State of New York, have invented an Improvement in Shield-Pins for Shawls, Scarfs, &c., of which the following is a specification.

Shield-pins have been made in which there is a contractile spring passing from the head of the pin toward the point, and a shield at the outer end of such spring that is drawn over the point, and the shield has in some instances been made of twisted wire.

My invention relates to a pin having two heads, one of which is connected to the pin itself, and the other is provided with a spring-sheath formed of a helix of wire, into which the point of the pin fits tightly, and the contraction of the spring-sheath upon the pin causes the sheath to hold tightly upon such pin and form a shield for the point.

Figure 2:
Figure 3:
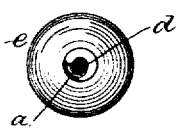
Figure 1:
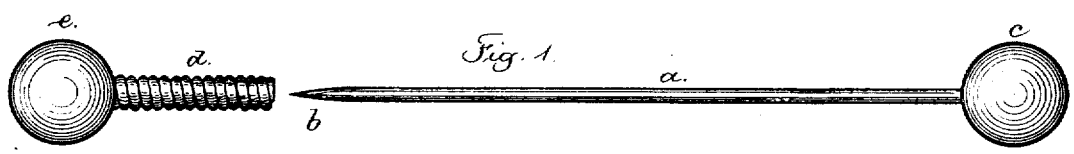

In the drawings, Figure 1 is an elevation of the pin and its sheath. Fig. 2 is a longitudinal section, and Fig. 3 is a cross-section at the line *x x*.

The pin *a* is preferably of steel, with a point, *b*, at one end, and a head, *c*, at the other end, and this head may be of any desired ornamental character. The sheath *d* is composed of a helix of wire, that is, by preference, ornamented by being plated, and this helix at one end is surrounded by or attached to the ornamental head *e*. This head *e* may be of any desired character, and may even be formed by a continuation of the wire of the helix enlarged to a ring or head. The interior diameter of this helix is slightly smaller than the wire composing the pin *a*; but the tapering point of the pin allows for said point to be inserted easily into the sheath, and at the same time the pin *a* is to be rotated and pressed into the sheath. The rotation of the pin is to be in the same direction that it would be if the helix were a screw, and the head *c* being held while this is being done the friction and pressure tend to expand the helix, because they are in the direction to tend to uncoil the helix; therefore in the normal condition the helix contracts powerfully upon the pin, and thereby remains firmly thereupon.

In order to separate the pin from the sheath the pin should be rotated in the same direction as before to expand the helical sheath, while the latter is held, and at the same time the pin is pulled upon and removed from the sheath.

I claim as my invention—

The spring-sheath for a pin, composed of a helix of wire, the interior diameter of which is slightly smaller than the pin, and a head upon the helix, whereby to hold the same when the pin is inserted or removed, substantially as set forth.

Signed by me this 19th day of January, A. D. 1881.

JOSEPH LEVI.

Witnesses:
 GEO. T. PINCKNEY,
 CHAS. H. SMITH.